United States Patent [19]

Hyakutake et al.

[11] Patent Number: 5,263,133
[45] Date of Patent: Nov. 16, 1993

[54] TEXT PROCESSING APPARATUS HAVING A FRAME PREPARATION FUNCTION

[75] Inventors: Tatsuhiro Hyakutake, Nara; Kenichi Watanabe, Yamatokoriyama, both of Japan

[73] Assignee: Sharp Corporation, Osaka, Japan

[21] Appl. No.: 544,836

[22] Filed: Jun. 27, 1990

[30] Foreign Application Priority Data

Jun. 28, 1989 [JP] Japan .................. 1-167361

[51] Int. Cl.$^5$ .................. G06F 15/62
[52] U.S. Cl. .................. 395/147; 395/144
[58] Field of Search .................. 395/144, 145, 147

[56] References Cited

U.S. PATENT DOCUMENTS

| 4,839,827 | 6/1989 | Hirata et al. | 364/518 |
| 5,051,930 | 9/1991 | Kuwabara et al. | 364/523 |

FOREIGN PATENT DOCUMENTS 62-95586 5/1987 Japan .
62-96822 5/1987 Japan .

OTHER PUBLICATIONS

English language abstract of Japanese Unexamined Patent Publication No. 96822/1987.
English language abstract of Japanese Unexamined Patent Publication No. 16380/1983.

*Primary Examiner*—Gary V. Harkcom
*Assistant Examiner*—Joseph Feild
*Attorney, Agent, or Firm*—David G. Conlin; George W. Neuner

[57] ABSTRACT

A text processing apparatus has a frame preparation function wherein a synthesized frame is prepared containing character information superposed on a prepared frame. The apparatus has structure to append control information to a space that is input as character information so that, when character string that has character information with a space is superposed over a prepared frame, the space input as character information is preserved as a space in the synthesized frame.

5 Claims, 3 Drawing Sheets

TEXT PROCESSING APPARATUS HAVING A FRAME PREPARATION FUNCTION

BACKGROUND OF THE INVENTION

1. Field of the Invention

The present invention relates to a text processing apparatus having a text editing function like a word processor, and more particularly to a text processing apparatus having a frame preparation function of enclosing a title of a text or the like with a frame.

2. Description of the Related Art

This kind of the text processing apparatus having the frame preparation function is constructed such that the frame can be prepared with straight lines, desired marks or symbols in order to distinguish a title portion of the text and the particular texts from other texts (see Japanese Unexamined Patent Publications Nos. SHO 62-95586 and 62-96822).

Furthermore, there is known a text processing apparatus in which characters are superposed on the frame and thereby a part of the frame can be constructed by a character string.

However, in case that a part of the frame is constructed by the character string, the straight lines or marks by which the frame is constructed are displayed or printed if the character string has a space. Therefore, it is difficult to read the character string. In addition, the printed character string looks poor.

SUMMARY OF THE INVENTION

In consideration of the above circumstances, it is an object of the present invention to provide a text processing apparatus having a frame preparation function in which a space can be incorporated into a frame if a character string superposed on the frame has the space.

The present invention provides a text processing apparatus having a frame preparation function comprising input means for inputting characters, a space, instructions and location information, mode setting means for setting a frame mode in response to an instruction inputted from the input means, character storage means for prestoring a lot of character information including marks and symbols, selection means for selecting desired one of the character information stored in the character storage means in response to an instruction from the input means at the time of the frame mode set by the mode setting means, frame preparation means for preparing and storing a frame in which the character information selected by the selection means is a frame component in a framing location on the basis of the inputted location information for framing and the selected character information at the time of the set frame mode, addition means for adding control information to the space inputted from the input means, character string storage means for storing at least character strings including the space to which the control information is added by the addition means, synthesis means for synthesizing the space to which the control information is added prior to the frame component in superposing the frame stored in the frame preparation means on the character string stored in the character string storage means at the time of the set frame mode, and output means for outputting the frame and character string synthesized by the synthesis means.

DETAILED DESCRIPTION OF PREFERRED EMBODIMENT

Figure 1:
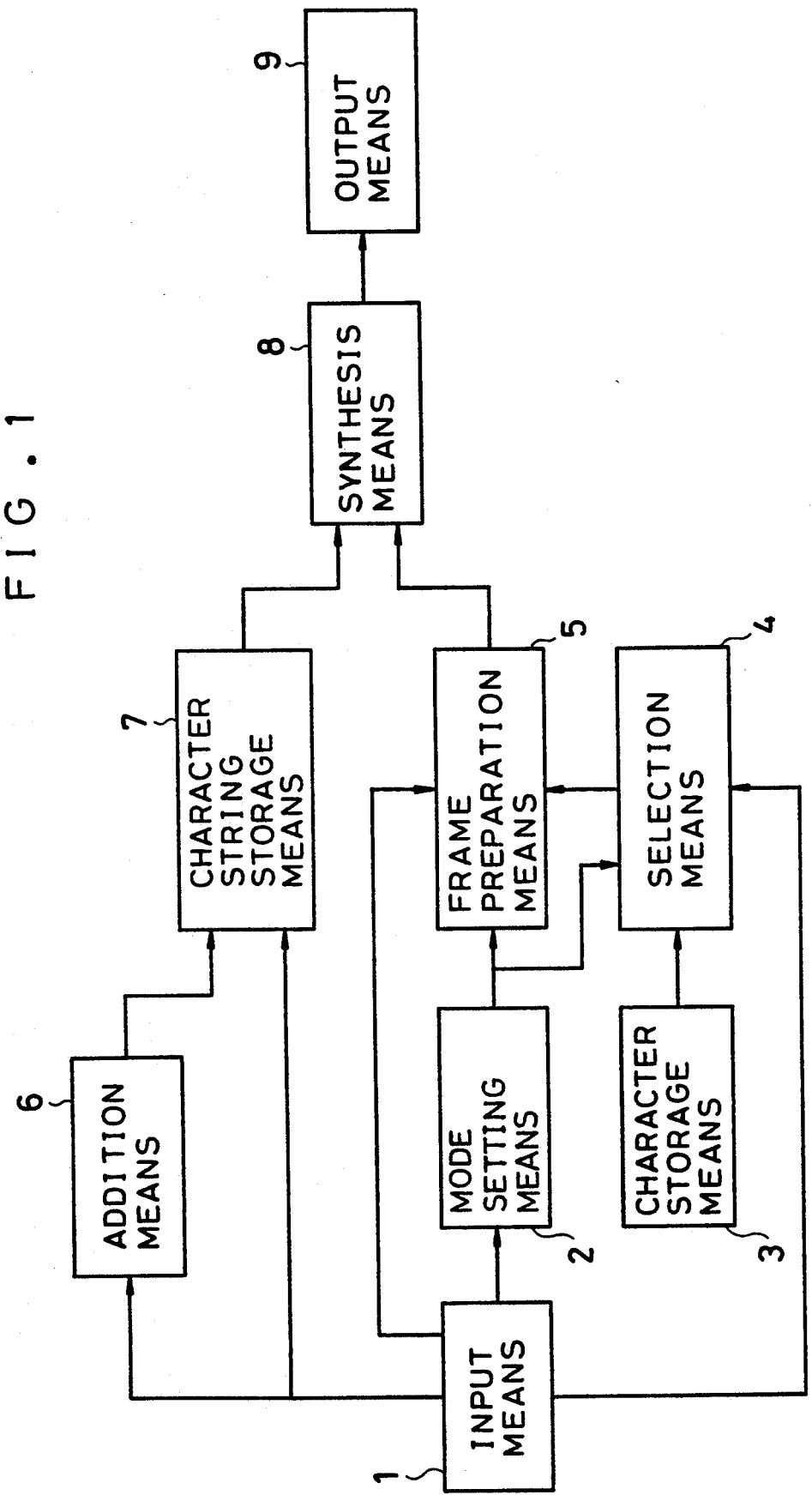
FIG. 1 is a logical block diagram showing an apparatus of the present invention in generalized form.

FIG. 1 is a logical block diagram showing an apparatus of the present invention in generalized form.

In FIG. 1, the numeral 1 denotes input means for inputting a variety of characters, a space and various instructions. The input means 1 is operably connected to mode setting means 2, selection means 4, frame preparation means 5, addition means 6 and character string storage means 7. The mode setting means 2 specifies various modes including a frame mode in response to the instructions inputted from the input means 1. The numeral 3 denotes character storage means for prestoring a lot of character information including marks and symbols operably connected to the selection means 4. The selection means 4 selects desired one of the character information stored in the character storage means 3 in response to the instruction from the input means 1 at the time of the frame mode set by the mode setting means 2. The frame preparation means 5 prepares and stores a frame in which the character information selected by the selection means 4 is a frame component in a framing location on the basis of inputted location information for framing and the selected character information at the set frame mode. The addition means 6 adds control information to code corresponding to the space inputted from the input means 1 and outputs the code with control information to the character string storage means 7. The character string storage means 7 stores character strings including the space to which the control information is at least added by the addition means 6. The numeral 8 denotes synthesis means. The synthesis means 8 synthesizes the space to which the control information is added prior to the frame component in superposing the frame stored in the frame preparation means 5 on the character string stored in the character string storage means 7 at the time of the set frame mode and outputs the synthesized information to output means 9. The output means 9 outputs the frame and character string synthesized by the synthesis means 8 on the basis of the inputted information.

The input means 1 of the present invention may be a keyboard comprising a character key, a space key, various function keys and the like. Moreover, the input means 1 may be constructed such that the keyboard is combined with a pointing device such as a mouse or the pointing device is combined with a device for inputting characters such as a tablet device or an OCR device.

The character storage means 3 is constructed by, for example, a ROM having a large capacity or a floppy or hard disk as a magnetic memory and a drive device thereof. The character information to be stored includes marks, symbols, kana characters, Chinese characters, alphabet, numeric characters and the like.

In the mode setting means 2, the selection means 4 and the frame preparation means 5, microprocessors may be main components.

The mode setting means 2 sets various modes including the frame mode by, for example, turning on or off a flag in response to the instructions inputted from the input means 1. Namely, if the mode is set, the flag is turned on.

The selection means 4 selects and reads the character information from the character storage means 3 in response to the instructions inputted from the input means 1 such as numbers indicating a storage location of the character information.

The frame preparation means 5 consecutively arranges the selected character information in the framing location specified by the location information for framing to prepare the frames and stores the frames thus prepared. The location information may be inputted by specifying a region. In this case, start and end points in which the frame components are arranged may be specified.

The respective means mentioned above may be the same as those in Japanese Patent Applications Nos. 60-240188 (Japanese Unexamined Patent Publication No. SHO 62-95586) and 60-240189 (Japanese Unexamined Patent Publication No. SHO 62-96822) of the present applicant.

The character string storage means 7 is constructed by, for example, a RAM to store the character strings which are at least synthesized with the frames.

In the addition means 6 and the synthesis means 8, the microprocessors may be the main components in similar to the mode setting means 2, the selection means 4 and the frame preparation means 5.

The addition means 6 adds the control information to the code indicating the space so as to distinguish a space in a character input mode at the time of preparing a text. The control information may be formed by, for example, adding 1 bit code to the space code.

The synthesis means 8 superposes the frame stored in the frame preparation means 5 on the character string stored in the character string storage means 7. The space included in the character string is synthesized by erasing the frame components corresponding to the location of the space.

The output means 9 may be a display device having a CRT, a LCD or the like and various printers.

With the construction mentioned above, the mode setting means 2 sets the frame mode in response to the instruction inputted from the input means 1. At the time of the set frame mode, the selection means 4 selects one of the character information stored in the character storage means 3 in response to the instruction inputted from the input means 1, and the frame preparation means 5 prepares and stores the frames on the basis of the inputted location information for framing and the selected character information.

The character string storage means 7 stores the character strings including the space to which the control information is added by the addition means 6. The synthesis means 8 synthesizes the character strings and the frames by causing the space in the character strings to be prior to the frame components. The output means 9 outputs the synthesized character strings and frame in a visible state.

Accordingly, the character of the frame component is not outputted to the space location. Therefore, it is easy to confirm the character strings synthesized with the frame.

While an embodiment of the present invention will be described in detail with reference to drawings, the present invention is not limited to the embodiment to be described below.

Figure 2:
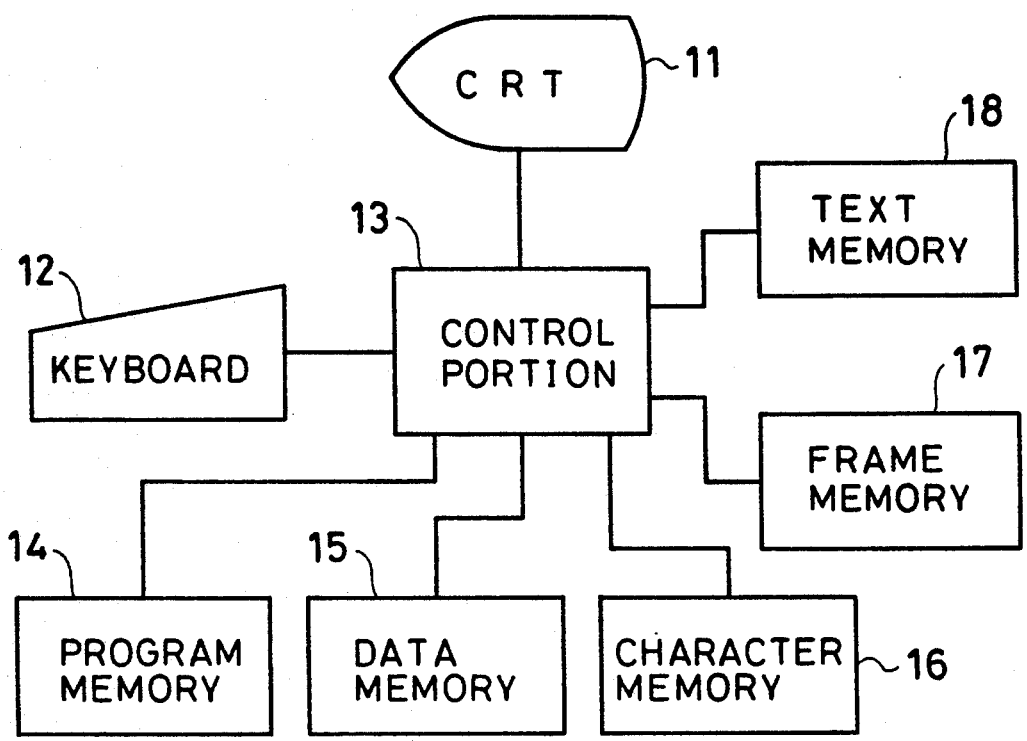
FIG. 2 is a block diagram showing a construction of an embodiment of the present invention.

In FIG. 2, the numeral 11 denotes a CRT and the numeral 12 denotes a keyboard. They are respectively connected to a control portion 13.

The keyboard 12 includes character keys, a space key, cursor keys, an execution key, function keys and a region specification key, which are provided in accordance with JIS arrangement.

The control portion 13 is constructed by a microcomputer, a key control circuit, a character generator, a buffer for display, a CRT controller and the like. The control portion 13 performs various data processing to be described below in accordance with a control program stored in a program memory 14 comprising a ROM.

The numeral 15 denotes a data memory in which selection screen data for setting various modes including the frame mode and setting data for each set mode are stored.

The numeral 16 denotes a character memory which is constructed by a large capacity ROM. The character memory 16 prestores marks, symbols and other characters such as alphabet, kana characters or Chinese characters.

The numeral 17 denotes a frame memory which respectively stores the location information to be inputted and the character information of the frame components at the time of the frame mode. The location information is coordinate data of a display screen of a CRT 11, which is obtained by region-specifying the start and end points of the desired frame (the start and end points are respectively designated by the numerals 20a and 20b in FIG. 4).

The numerals 18 denotes a text memory which is constructed by a large capacity RAM. The text memory 18 stores the character strings and the texts inputted from the keyboard 12.

Figure 4:
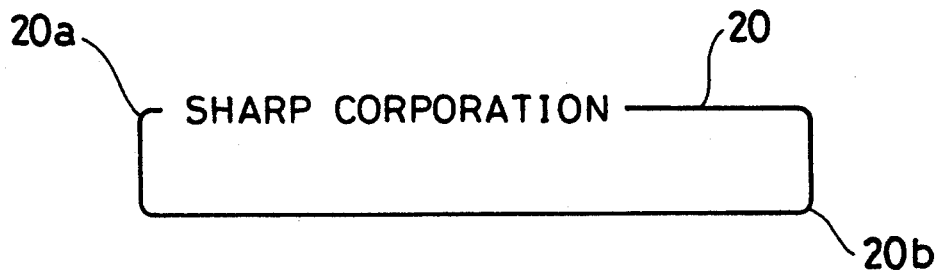
FIG. 4 is a diagram showing output information obtained in the embodiment, in which character strings and frames are synthesized.

There will be described the operation of the present embodiment with reference to FIGS. 3 and 4.

In case of inputting the frame, the character string to be superposed on the frame is inputted. By way of example, "SHARP CORPORATION" is inputted. In this case, since the above example is the character string to be superposed on the frame, the space is to be inserted before and after "SHARP" and after "CORPORATION", respectively. This space is inputted by pressing down the function key and the space key of the keyboard 12 simultaneously. Thereby, the control portion 13 adds 1 bit code of the control information to the space code at the time of pressing down the space key to store them along with the character strings in the text memory 18. The space code to which the control information is added is considered as a space with code.

The framing is performed by pressing down the function key in which the frame mode is set. When the frame mode is set, the selection screen data stored in the data memory 15 is displayed on the CRT 11. In that state, when the region specification key is pressed down after the cursor is moved to a location to be the start point of the frame, the location information of the start point is stored in the frame memory 17. Then, when the region specification key is pressed down after the cursor is moved to a location to be the end point of the frame, the location information of the end point is stored in the frame memory 17.

When the start and end points of the frame are inputted, the screen is brought into the state in which the frame components can be selected. Herein, the character "———(a heavy line)" is selected by operating the keyboard 12. The code of the character thus selected are stored in the frame memory 17.

When the input operation is completed, the control portion 13 synthesizes the data for the frames stored in the frame memory 17 and the character strings stored in the text memory 18.

On the other hand, after the frames are inputted, the character strings may be inputted.

Figure 3:
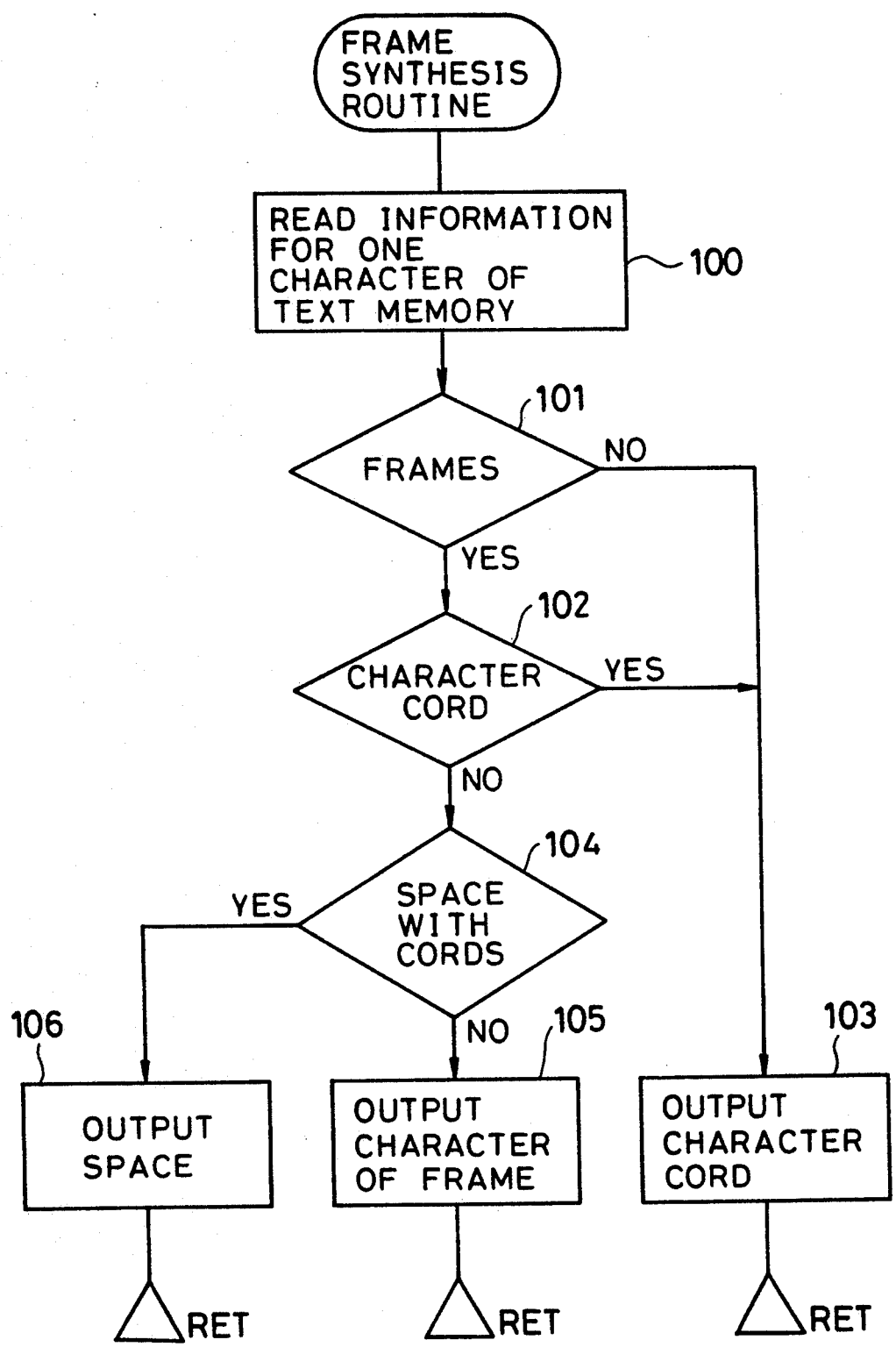
FIG. 3 is a flow chart showing the operation of the embodiment.

In FIG. 3, the synthesis is performed by determining whether there are the characters and the space with code between the start and end points of the frame.

In Step 100, the information for one character which is stored in the text memory 18 is first read. By means of the location information stored in the frame memory 17, it is then determined whether there is the frame in a location corresponding to the information for one character thus read (Step 101). If it is determined that there is the frame in the above location, it is determined whether the information for one character thus read is a character code (Step 102). If the information for one character is the character code, the character code is outputted to the buffer for display (Step 103).

In Step 102, if it is determined that the information for one character is not the character code, it is determined whether the information for one character is the space with code (Step 104). If the information for one character is not the space with code, the characters of the frame components are outputted to the buffer for display (Step 105). Conversely, if the information for one character is the space with code, the code of the space is outputted to the buffer for display (Step 106). Thereby, the space is displayed on the CRT 11 prior to the characters of the frame.

By repeatedly executing the above process from the start point to the end point of the frame, the information in which the frame and the character strings of the text memory 18 are synthesized is stored in the buffer for display. Then, the synthesis information is outputted to the CRT 11 through a CRT controller. Thereby, the character string "SHARP CORPORATION" is superposed on a frame 20 formed by "———" as shown in FIG. 4.

In case that it is determined that there are not the frame in Step 101, that is, the information for one character in the location within the frame is read, the character code is outputted to the buffer for display if the information for one character thus read is the character code.

According to the present invention, in case that the character string to be superposed on the frame includes the space, the characters of the frame components are not outputted to the space. Therefore, a text processing apparatus having a frame preparation function of outputting the frame which looks much better can be obtained. In case that the frame having the above construction are used in data for OHP (overhead projector), it is especially effective.

What is claimed is:

1. A text processing apparatus for providing a frame in which character information is superposed on a prepared frame, said apparatus comprising:
    input means for inputting character information including characters, marks, symbols and a space adjacent to a character, and for inputting instructions including frame location information for locating the position of character information superposed on the frame;
    mode setting means for setting a frame mode for preparation of a frame in response to an instruction from the input means;
    character storage means for storing the character information from the input means to use for frame component information;
    selection means for selecting desired frame component information from the character information stored in the character storage means in response to an instruction from the input means when the frame mode is set;
    frame preparation means for preparing and storing a frame having superposed character information;
    addition means for appending control information to a space input as character information by the input means;
    character string storage means for storing character strings for frame component information, the character strings including a space input as character information with the appended control information from the addition means;
    frame means for providing frame component information for a prepared frame;
    synthesis means for partially replacing frame component information of the prepared frame with a character string from the character string storage means to form a synthesized frame having character information superposed on the prepared frame wherein a space input as character information is preserved as a space in the synthesized frame; and
    output means for outputting the synthesized frame.

2. The apparatus of claim 1, wherein the mode setting means comprises a flag that is turned on if an instruction for setting a frame mode is input by the input means.

3. The apparatus of claim 1, wherein the frame preparation means comprises a frame memory for storing frame location information including coordinate position data indicating start and end points for inserting selected character information into the prepared frame to form the synthesized frame.

4. The apparatus of claim 1, wherein the synthesis means comprises:
    read means for reading information for each character of a character string stored in the character storage means;
    first determination means for determining whether frame component information of the prepared frame is located in a position corresponding to the frame location information for each character of the character string;
    second determination means for determining whether the information for each character contains a character code;
    third determination means for determining whether the information for each character, which does not contain a character code as determined by the second determination means, is a space input as character information to which control information has been appended by the addition means; and
    space priority means for preserving the location of the space, which was input as character information as determined by the third determination means, as a space in the synthesized frame.

5. The apparatus of claim 1, wherein the output means is a cathode ray tube.

* * * * *